(No Model.)

S. STIGLER.
FRUIT DRIER.

No. 361,905. Patented Apr. 26, 1887.

WITNESSES:
Fred G. Dieterich
John C. Kenon

INVENTOR:
S. Stigler
BY Munn & Co
ATTORNEYS.

UNITED STATES PATENT OFFICE.

SYLVESTER STIGLER, OF CLAYSVILLE, OHIO.

FRUIT-DRIER.

SPECIFICATION forming part of Letters Patent No. 361,905, dated April 26, 1887.

Application filed August 9, 1886. Serial No. 210,470. (No model.)

*To all whom it may concern:*

Be it known that I, SYLVESTER STIGLER, of Claysville, in the county of Guernsey and State of Ohio, have invented a new and useful Improvement in Fruit-Driers, of which the following is a specification.

My invention consists in an improved fruit-drier, among the advantages of which are quickness and evenness of drying, economy of space, simplicity and cheapness of construction, and durability, and which will be hereinafter fully described and claimed.

Figure 1:
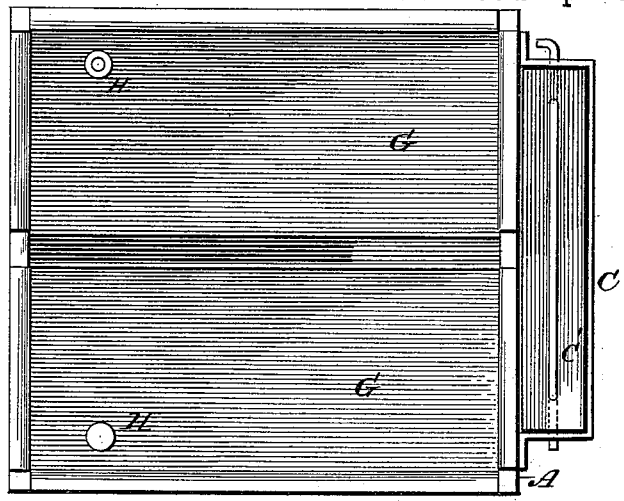
Figure 3:
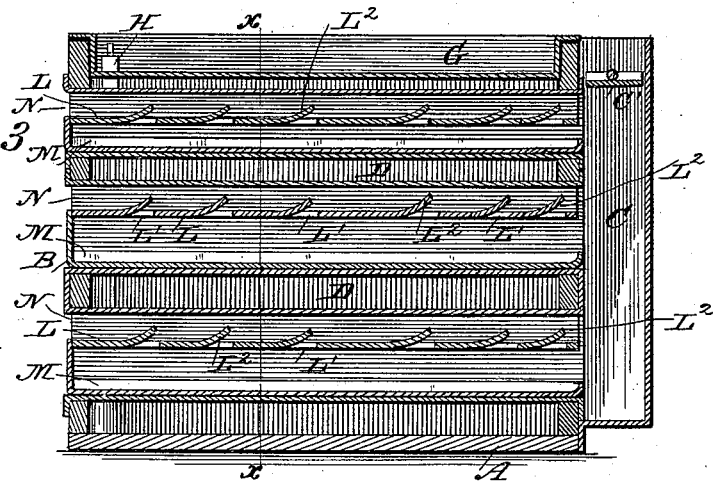
Figure 2:
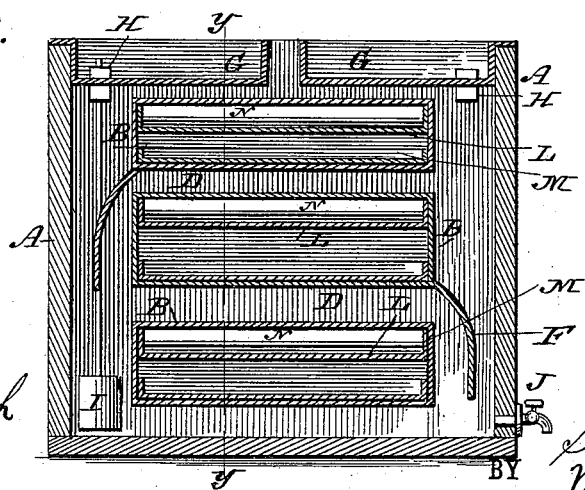

Referring to the accompanying drawings, Figure 1 is a plan view. Fig. 2 is a tranverse vertical sectional view taken on the plane indicated by line $x\,x$, Fig. 3. Fig. 3 is a longitudinal vertical sectional view taken on the plane indicated by line $y\,y$, Fig. 2.

The same letters of reference indicate corresponding parts in all the figures.

Referring to the several parts by letter, A represents the outer casing of my improved fruit drier, the bottom of which forms a boiler, to which the heat is applied. In this outer casing are secured the parallel drying-apartments B, which are made rectangular in cross-section and extend the full length of the outer casing, their forward ends extending through the forward side or wall of the outer casing, and being open, as shown, while their rear ends extend through the rear wall of the outer casing and open into the chimney C, which is secured at the rear end of the casing, being as wide as the apartments themselves—that is, nearly the width of the outer casing—and having the top damper, C', to regulate the draft through it and the apartments. These several drying-apartments B, which are made of suitable sheet metal, and which may be of any desired number, are arranged so as to leave a space, D, between them and between the walls of the outer casing and the apartments. The lower edge (in the drawings the lower right-hand edge) of the second apartment from the bottom has a downwardly-curved flange, F, extending down to the level of the bottom of the apartment below it, and the lower left-hand edge of the third apartment has a similar flange extending downward to the level of the bottom of the second apartment, the said downwardly-curved flanges extending out to one-half of the distance between the sides of the apartments and the sides of the outer casing.

The top of the drier is formed by the two removable pans or reservoirs G G, which are so arranged as to leave a space between their inner sides extending the full length of the apartments, over the central line of the same. The joints between the several parts and the walls of the outer casing are perfectly water and steam tight.

In operation, if it is desired to dry the fruit by steam, I fill the outer casing only partly full of water; but when I desire to dry the fruit by hot water I fill the outer casing entirely full of water. I prefer to dry the fruit by hot water, as by this method the fruit can be dried much quicker and retains its full flavor. As the water in the boiler in the bottom of the outer casing becomes heated to the boiling-point, it rises up each side of the lower apartment, when that portion going up on the right-hand side is divided by the flange F, so that half of it passes through between the first and second apartments and then upon the left-hand side, where the hot water is divided by the second flange, and half of it passes through between the second and third apartments, and so on, this arrangement and construction of the flanges causing a perfect circulation of the hot water or steam, when the latter is employed, around and between the several apartments, so that the fruit contained in the several apartments is thoroughly and evenly evaporated, the steam escaping through the space between the inner sides of the top pans or reservoirs. These reservoirs, besides forming the top of the drier, are usually kept full of water, which is thus gradually heated, and by removing the plugs H H this water is permitted to run down into the boiler when required.

In order to ascertain the state of the water in the boiler, I employ a gage, I, consisting of the float having the rod passing up through a central opening in one of the plugs H, the said opening being of just sufficient size to admit of the passage of the gage-rod. Any other suitable form of gage may be employed. At the lower right-hand corner of the outer casing is inserted a spigot, J, through which the water may be drawn off out of the boiler when desired. As the fruit-drying and fruit-canning seasons come at the same time, one of the removable reservoirs G can be used for boiling fruit or similar purposes while the fruit is being dried in the apartments.

The interior space of each of the fruit-drying apartments is divided into two horizontal portions by a horizontal partition, L, which extends the full length of the apartment and is formed with the transverse slots L' and the rearwardly and upwardly inclined transverse flanges L². The lower space formed by this partition is the drying-chamber proper, and in this chamber fits and slides a drawer, M, formed preferably of sheet-zinc, properly curved up around its edges and having its front end bent up at right angles, so that when the drawer is pushed in its upwardly-bent front end will entirely close the mouth of the drying-chamber proper.

It will be seen that as the hot water or steam circulates around the several apartments the fruit will be dried, and the steam rising off of the fruit passes up through the slots of the partitions into the upper chamber or air-passage, N, when it will be carried by the air entering through the open front end of the said air-chambers up through the rear chimney, the rearwardly-inclined flanges L² of the partitions preventing the air entering at the front of the air-chambers from blowing down through the slots of the partitions into the drying-chamber; and as the rear chimney, C, is as wide as the apartments, a perfect and complete draft is effected, and all the steam arising from the fruit is effectually carried off up the chimney; the slots extending nearly the entire width of the partitions and having the flanges inclining toward the chimney, causing the steam to pass off the fruit perfectly and evenly.

From the foregoing description, taken in connection with the accompanying drawings, the construction, operation, and advantages of my improved fruit-drier will be readily understood. It will be seen that the fruit will be dried perfectly, rapidly, and evenly, and will retain all of its fresh flavor, while the apparatus is simple and cheap in construction and very durable. The heating medium can be changed from steam to hot water without the least trouble.

Having thus described my invention, what I claim, and desire to secure by Letters Patent, is—

1. The combination, with the apartments open at both ends, of the horizontal partitions arranged as described and formed with the transverse slots and the rearwardly and upwardly bent transverse flanges, and the drawers having the upwardly-bent front ends.

2. The combination, with the outer casing, of the apartments arranged as described and open at both ends, the wide chimney into which the rear ends of the apartments open, the horizontal partitions arranged as described and formed with the transverse slots and the rearwardly and upwardly bent transverse flanges, and the drawers having the upwardly-bent front ends.

3. The combination of the casing, the apartments therein, and the reservoirs forming the top of the drier and having a space or channel between their inner or adjacent sides, substantially as set forth.

4. The combination of the casing having the apartments therein forming the tray-supports, and provided with draft-passages above the same, and the partitions having openings leading from the tray-supports into the draft-passages, substantially as set forth.

5. The combination, with the casing having the apartments forming the tray-supports and provided with draft-passages above the same, of the partitions arranged between said tray-supports and draft-passages and having openings, and the flanges extended rearwardly over said openings, substantially as set forth.

SYLVESTER STIGLER.

Witnesses:
 ALEX. MACKEY,
 JOSEPH STEVENS.